(12) United States Patent
Fan et al.

(10) Patent No.: US 10,554,872 B2
(45) Date of Patent: *Feb. 4, 2020

(54) METHOD AND APPARATUS FOR MANAGING A CAMERA NETWORK

(71) Applicant: AT&T INTELLECTUAL PROPERTY I, LP, Atlanta, GA (US)

(72) Inventors: James Fan, San Ramon, CA (US); Thomas Barrett, San Ramon, CA (US); Jennifer K. Lam, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,008

(22) Filed: Sep. 25, 2015

(65) Prior Publication Data

US 2016/0014324 A1      Jan. 14, 2016

Related U.S. Application Data

(63) Continuation of application No. 13/272,552, filed on Oct. 13, 2011, now Pat. No. 9,179,104.

(51) Int. Cl.
*H04N 5/232* (2006.01)
*H04N 7/18* (2006.01)
(Continued)

(52) U.S. Cl.
CPC ..... *H04N 5/23206* (2013.01); *G06Q 30/0214* (2013.01); *G06Q 30/0257* (2013.01);
(Continued)

(58) Field of Classification Search
USPC .......................................... 348/159, E7.085
See application file for complete search history.

(56) References Cited

U.S. PATENT DOCUMENTS 7,454,128 B2    11/2008   Lang et al.
2002/0010757 A1*  1/2002   Granik .............. G06F 17/30876
                                                    709/218
(Continued)

OTHER PUBLICATIONS

"Flickr", www.flickr.com; Jul. 28, 2011.
(Continued)

*Primary Examiner* — Christopher S Kelley
*Assistant Examiner* — Ana Picon-Feliciano
(74) *Attorney, Agent, or Firm* — Guntin & Gust, PLC; Jay Anderson

(57) ABSTRACT

A system that incorporates teachings of the present disclosure may include, for example, receiving location information associated with a mobile communication device, determining a first location of the mobile communication device based on the location information, selecting a first camera from a group of cameras based on the determined first location, receiving at least one first image from the selected first camera that captures at least a portion of the first location, performing image recognition on at least one second image to identify a user associated with the mobile communication device, selecting another camera from the group of cameras based on a determined position of the identified user, and receiving at least another image from the selected other camera. Other embodiments are disclosed.

20 Claims, 7 Drawing Sheets

(51) Int. Cl.
  *H04N 21/218*   (2011.01)
  *H04N 21/234*   (2011.01)
  *H04N 21/258*   (2011.01)
  *H04N 21/2668*  (2011.01)
  *H04N 21/414*   (2011.01)
  *H04N 21/4223*  (2011.01)
  *H04N 21/4415*  (2011.01)
  *H04N 21/45*    (2011.01)
  *H04N 21/6587*  (2011.01)
  *H04N 21/81*    (2011.01)
  *H04N 21/84*    (2011.01)
  *G06Q 30/02*    (2012.01)
  *G06T 11/60*    (2006.01)
  *H04N 5/247*    (2006.01)
  *G08B 13/196*   (2006.01)

(52) U.S. Cl.
  CPC ......... *G06T 11/60* (2013.01); *H04N 5/23229* (2013.01); *H04N 5/247* (2013.01); *H04N 7/181* (2013.01); *H04N 21/21805* (2013.01); *H04N 21/23424* (2013.01); *H04N 21/25841* (2013.01); *H04N 21/25891* (2013.01); *H04N 21/2668* (2013.01); *H04N 21/41407* (2013.01); *H04N 21/4223* (2013.01); *H04N 21/4415* (2013.01); *H04N 21/4532* (2013.01); *H04N 21/6587* (2013.01); *H04N 21/812* (2013.01); *H04N 21/84* (2013.01); *G08B 13/19656* (2013.01)

(56) References Cited

U.S. PATENT DOCUMENTS

| | | |
|---|---|---|
| 2002/0063778 A1 | 5/2002 | Kormos |
| 2005/0198095 A1* | 9/2005 | Du .................. G06Q 10/087 709/200 |
| 2005/0206727 A1 | 9/2005 | Kormos |
| 2006/0139482 A1 | 6/2006 | Miguel Sanz et al. |
| 2008/0002892 A1* | 1/2008 | Jelonek ............ G06F 17/30265 382/224 |
| 2008/0055409 A1 | 3/2008 | Mars et al. |
| 2008/0074256 A1 | 3/2008 | Hirai |
| 2008/0147730 A1* | 6/2008 | Lee .................... G06Q 30/0212 |
| 2008/0266447 A1 | 10/2008 | Ohara et al. |
| 2008/0297608 A1* | 12/2008 | Border .............. H04N 1/00204 348/207.11 |
| 2009/0100886 A1 | 4/2009 | Orzech et al. |
| 2009/0265105 A1 | 10/2009 | Davis |
| 2009/0324103 A1* | 12/2009 | Gelfand .................. G06T 11/60 382/224 |
| 2010/0277611 A1* | 11/2010 | Holt ................. G06F 17/30265 348/231.2 |
| 2011/0134243 A1 | 6/2011 | Siann |
| 2011/0184953 A1 | 7/2011 | Joshi |
| 2011/0234819 A1 | 9/2011 | Gabriel |
| 2011/0255736 A1* | 10/2011 | Thompson ............. G06Q 30/02 382/100 |
| 2011/0256886 A1* | 10/2011 | Velusamy ............. G01S 5/0009 455/456.1 |
| 2013/0046637 A1* | 2/2013 | Slutsky ............. G06Q 30/0269 705/14.66 |

OTHER PUBLICATIONS

Burbn, Inc., "Instagram, Fast Beautiful Photo Sharing for your iPhone", 2 pages, http://instagr.am/, Web site last visited Jul. 28, 2011.

Youtube, LLC, "Broadcast Yourself", 2 pages, http://www.youtube.com, Web site last visited Jul. 28, 2011, Dec. 20, 2007, 2 pages.

\* cited by examiner

500

600

METHOD AND APPARATUS FOR MANAGING A CAMERA NETWORK

CROSS-REFERENCE TO RELATED APPLICATIONS

This application is a Continuation of and claims priority to U.S. patent application Ser. No. 13/272,552, filed Oct. 13, 2011. The contents of each of the foregoing is/are hereby incorporated by reference into this application as if set forth herein in full.

FIELD OF THE DISCLOSURE

The present disclosure relates generally to personal content and more specifically to managing a camera network.

BACKGROUND

It is often desirable to try to memorialize personal experiences for individuals or groups while on excursions, such as vacations, trips and so forth. Capturing photos or video clips helps preserve memories of the excursion.

Images captured by an individual typically become part of the personal content of the individual that is saved for preserving those memories. The individual often desires to customize the personal content and share that content with others.

DETAILED DESCRIPTION

Figure 1:
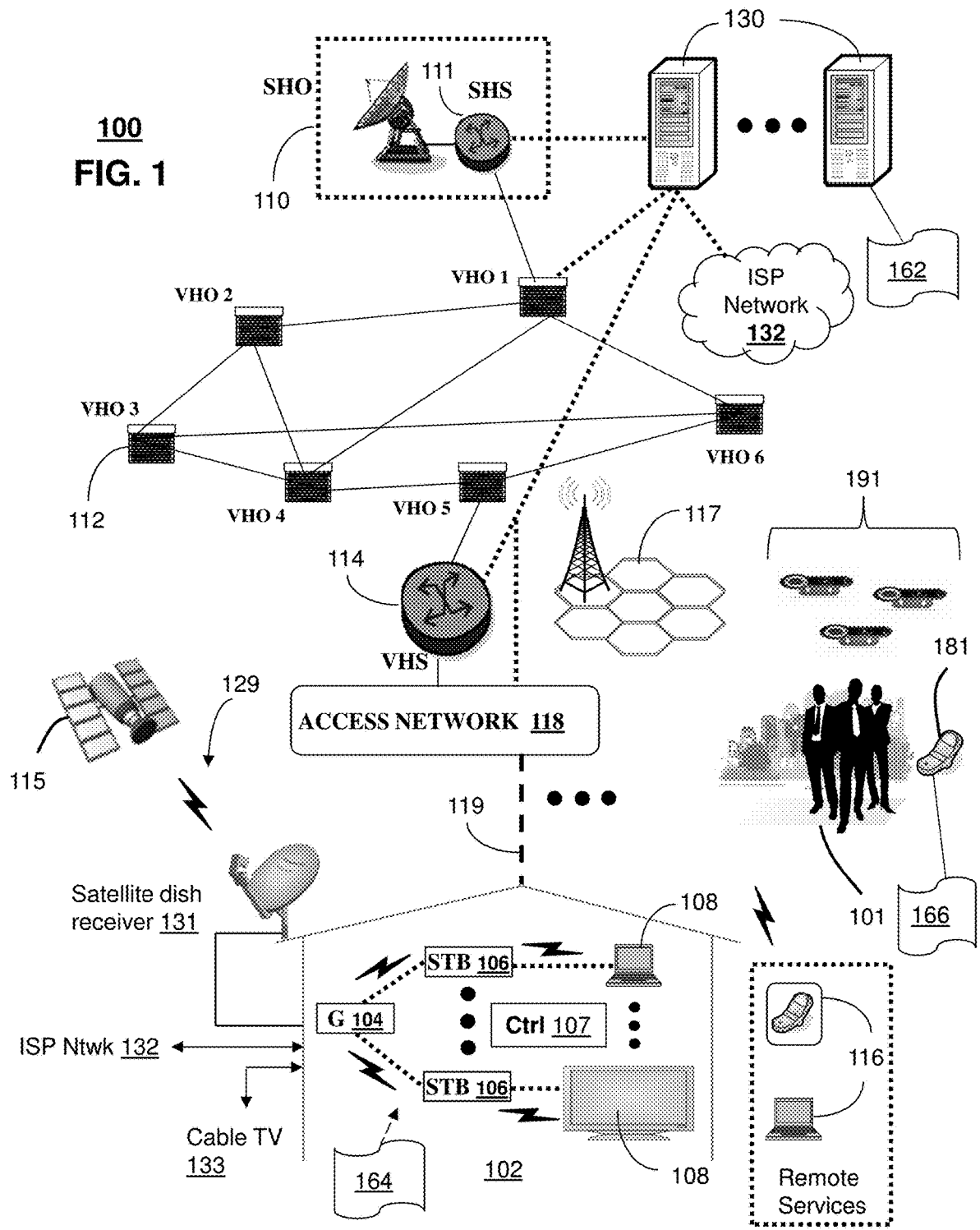
FIG. 1 depicts an illustrative embodiment of a communication system that provides content.

The present disclosure describes, among other things, illustrative embodiments for generating content, including images and/or audio notes, associated with a user and which is generated utilizing a network of cameras. A mobile communication device, such as a smart phone or a dedicated location transmitting device, can be in communication with the network for selecting particular cameras among a group of cameras that capture the images. In one embodiment, the network can determine an object that is being observed by a user and can focus one or more cameras on the observed object for capturing images of the object. In one embodiment, a user can share captured images of an object or a particular location with other users that have attempted to capture or otherwise desire to capture the object or particular location. The sharing of the images can be based on a revenue sharing plan or other incentive process so that a user who shares images receives a benefit for doing so.

In one embodiment, captured images can be altered based on a number of factors, including preferences of the user capturing the images or preferences of a viewer who has requested access to the captured images. The alteration of the images can be based on marketing materials, such as updating older versions of advertisements in the images (such as an out-of-date billboard). In one embodiment, a user can add audio notes via the mobile communication device to enhance the content, such as a description of an object being observed. In one embodiment, the audio notes can be analyzed to determine relevant subject matter so that the audio notes can be assigned or otherwise associated with captured images depicting the relevant subject matter.

One embodiment of the present disclosure includes a server having a memory and a controller circuit coupled to the memory. The controller circuit can be programmed to receive location information from a mobile communication device and to determine a first location of the mobile communication device based on the location information. The controller circuit can be programmed to select a first camera from a group of cameras based on the determined first location and to receive at least one first image that captures at least a portion of the first location from the selected first camera. The controller circuit can be programmed to receive wireless signals associated with the mobile communication device and to determine a second location of the mobile communication device based on the received wireless signals. The controller circuit can be programmed to receive at least one second image of the second location from a second camera of the group of cameras responsive to the determination of the second location of the mobile communication device. The controller circuit can be programmed to perform image recognition including facial recognition on the at least one second image to identify a user associated with the mobile communication device and to determine a position of the identified user in the second location. The controller circuit can be programmed to select a third camera from the group of cameras based on the determined position of the identified user, can be programmed to receive at least one third image from the selected third camera that captures at least a portion of the second location, and can be programmed to store the at least one first image and the at least one third image.

One embodiment of the present disclosure is a method that includes receiving first location information from a mobile communication device, determining a first location of the mobile communication device based on the first location information, and selecting a first camera from a group of cameras based on the determined first location. The method can include receiving at least one first image that captures at least a portion of the first location from the selected first camera, receiving second location information from the mobile communication device, and determining a second location of the mobile communication device based on the second location information. The method can include selecting a second camera from the group of cameras based on the determined second location and receiving at least one second image that captures at least a portion of the second location from the selected second camera. The method can include receiving audio content and performing voice recognition on the audio content to generate user notations where the voice recognition is performed by a server. The method can include analyzing the user notations using recognition libraries to determine subject matter of the user notations, where the user notations are analyzed by the server. The method can include associating the user notations with at least one of the at least one first image or the at least one second image based on the determined subject matter, and enabling access to personal content that includes the at least one first image, where the at least one second image and notation information are representative of the audio content.

One embodiment of the present disclosure includes a non-transitory computer-readable storage medium comprising computer instructions which, when executed by a processor, cause the processor to receive location information associated with a mobile communication device, determine a location of the mobile communication device based on the location information, and select a first camera from a group of cameras based on the determined location. The computer instructions also cause the processor to receive a first image from the selected first camera where the first image captures at least a portion of the first location, and perform image recognition on the first image to identify a user associated with the mobile communication device and to identify an object being observed by the identified user. The computer instructions also cause the processor to select a second camera from the group of cameras based on the identified object of the identified user, receive a second image from the selected second camera that captures the identified object, and store the second image.

FIG. 1 depicts an illustrative embodiment of a first communication system 100 for delivering content. The content can be of various types including personal content that has images (e.g., still or moving) and/or audio. The content can be of other types of content including broadcast programming, video-on-demand, video games, data, voice communications and so forth. The communication system 100 can generate personal content related to an environment 101, such as a user present at a sporting event, a museum or other location of interest, a user walking through a shopping mall, a user playing at a park, and so forth. The communication system 100 can generate the content by capturing images of the environment 101 via one or more cameras 191 (e.g., a network of cameras) that are in proximity to the environment 101. In one embodiment, a mobile communication device 181 can enable capturing of images via the cameras 191. In one embodiment, the mobile communication device 181 can generate or otherwise be associated with location information that is utilized for determining a location of the mobile communication device. The determined location can be utilized for selecting one or more cameras 191 among the network of cameras for capturing the images of the user of the mobile communication device 181.

The mobile communication device 181 can be of various types of devices, including a smart phone capable of voice communications with other devices and capable of downloading software applications associated with the cameras 191. In one embodiment, the mobile communication device 181 can be a device that does not provide two-way voice communications with other devices but can provide location information to enable capturing of the images by the cameras 191 and/or can transmit audio content to be included with the personal content. In another embodiment, the mobile communication device 181 can record the audio content without wirelessly transmitting the audio content. In one embodiment, the mobile communication device 181 can be a multi-mode communication device capable of communicating using a number of different communication protocols separately or simultaneously, including long-distance and short-distance communication protocols.

In one embodiment, the mobile communication device 181 can utilize wireless signals, such as radio frequency (RF) signals, to communicate locally with the cameras 191 or a receiver in proximity to the cameras 191. This local communication between the mobile communication device 181 and the network of cameras 191 can be in place of, or in addition to, providing location information associated with the mobile communication device. As an example, the environment 101 can include indoor and outdoor portions. The outdoor portions of the environment 101 (e.g., a park or a street) may more readily allow for determining a location of the mobile communication device 181 via the location information (e.g., GPS data) of the mobile communication device. Based on the determined location of the mobile communication device 181, one or more cameras 191 can be selected for capturing images of the user(s) of the mobile communication device 181 present at the outdoor portion of the environment 101. The use of the term user(s) in this example is intended to include the subscriber of a wireless service that supports communications at the mobile communication device 181 and/or individuals that are accompanying or are otherwise associated with the subscriber. The indoor portions of the environment 101 (e.g., inside of a museum or a stadium) may less readily allow for determining a location of the mobile communication device 181 via the location information (e.g., GPS data) of the mobile communication device. In some environments, there may not be any location information available for the mobile communication device 181. The wireless signal (such as RF signals) can be provided by the mobile communication device 181 to the cameras 191 or a receiver in the indoor portion of the environment 101 for determining a general location of the user(s) of the mobile communication device 181 so that images of the user(s) can be captured. Based on a determined position of the user(s) associated with the mobile communication device 181, one or more cameras 191 can be selected for capturing images of the user(s) of the mobile communication device 181 present at the indoor portion of the environment 101. In this example, image recognition, including facial recognition can be used to identify the user(s) associated with the mobile communication device 181 to capture the relevant images.

In one embodiment, a service provider can enter an agreement with local merchants, such as hotels and stores to rent or sell personalized souvenirs (e.g., pendants, watches, bracelets, disposable handsets, and so forth). The personalized souvenirs can be the mobile communication device 181 in the form of a wireless device such as a purpose-built smart phone-like device or small wearable device, which has built-in location capability (e.g., GPS capability). In this example, the wireless device 181 can have a number of different functions. In one embodiment, a first function of the wireless device 181 can be built-in GPS capability for activating or notifying cameras 191. When activated, the GPS location data of the wireless device 181 can enable the video cameras 191 to take video/picture clips for one or more users associated with the wireless device (e.g., tourists). In one embodiment, a second function can enable the tourists to interact with the cameras 191 or a tour-guide navigation system to select one or a set of cameras, control the viewing angle and/or zooming function of the cameras either in real-time or during a trip pre-planning stage.

The cameras 191 can be of various types of devices and can be operated by the same entity or by difference entities. In one embodiment, a service provider can obtain images captured by one or more cameras 191 that are being operated by another entity based on an incentive plan provided to the other entity, such as revenue sharing or resource sharing. In one embodiment, a communication service provider can enter into an agreement with local cities, merchants, buildings and/or local tour providers to establish an IP based video camera network utilizing the cameras 191. This network can include both wired and wireless technologies depending on the local conditions.

In one embodiment, the cameras 191 can be controlled in whole or in part by the mobile communication device 181, such as controlling a viewing angle and/or a zooming function of the cameras. Whether or not the cameras 191 are controllable by the mobile communication device 181 can be based on a number of different factors, including the service plan associated with the mobile communication device and/or the entity operating the cameras. For instance, the mobile communication device 181 can be permitted to control a first camera 191 that is a dedicated camera of a service provider but may not be permitted to control a second camera which is a security camera for a building that is operated by another entity (e.g., a security company). In this example, the security company may provide images of the user of the mobile communication device 181 to the service provider without relinquishing control over the security camera 191. The images provided from the security camera 191 can be designated based on location information provided by the mobile communication device 181 so that the images are associated with the user when the user is in the field of view of the security camera.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent in whole or in part, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia content, including broadcast content or personal content obtained via the network of cameras 191, via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and/or media devices 108 can utilize tethered communication technologies (such as coaxial, powerline or phone line wiring) or can operate over a wireless access protocol such as Wireless Fidelity (WiFi), Bluetooth, Zigbee, or other wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD, EPG and access to personal content as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services, including access to personal content.

The embodiments of the present disclosure can apply to over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or portable communication devices 116 and/or 181.

Multiple forms of media services can be offered to media devices over landline technologies in the communication system 100 such as through the devices and/or techniques described above. Additionally, media services can be offered to media devices by way of a wireless access base station 117 operating according to wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on.

Communication system 100 can also provide for all or a portion of the computing devices 130 to function as a content coordination server (herein referred to as server 130). The server 130 can use common computing and communication technology to perform function 162, which can include among things, coordinating the generation of personal content utilizing the network of cameras 191 in proximity to the environment 101. The network of cameras can be in communication with the server 130 or another control device through various means, including wireless and wired connections.

The server 130 can be used to receive location information associated with the mobile communication device 181 which enables selection of corresponding one or more cameras 191 to capture images associated with the user(s) of the mobile communication device 181. The location information can be received by the server 130 from the mobile communication device (e.g., GPS data) and/or can be received from other devices, such as from network elements in communication with the mobile communication device (e.g., one or more cellular towers).

In one or more embodiments, the server 130 can perform recognition analysis on one or more captured images to identify a user(s) associated with the mobile communication device and to identify a position of the user(s). The recognition analysis can include facial recognition, as well as recognition based on other criteria. The server 130 can have access to recognition information associated with user(s) (e.g., the subscriber and/or individuals that have been associated with the subscriber for the service plan) that are associated with the mobile communication device 181, such as images of the user(s) and/or audio samples. For instance, the images can be facial images, full body images, side images, back images and so forth. The audio samples can be of various sentences or phrases spoken by the user(s) and voice recognition can be applied to audio content captured in combination with the images. Using the recognition analysis and the determined position of the identified user(s), the server 130 can select one or more cameras 191 from the network of cameras to capture images of the user(s) and the surroundings of the identified user(s).

In one embodiment, the mobile communication device 181 can transmit wireless signals to a receiver for determining a general location of the user(s) of the mobile communication device and then an image of the general location can be analyzed, such as by server 130, utilizing the image recognition for identifying the user(s) and determining the corresponding position. The exemplary embodiments refer to user(s) of the mobile communication device 181, which can include the subscriber of the personal content service as well as other individuals that are associated with the subscriber and are present at the various locations with the mobile communication device. The server 130 can store recognition information for the user(s) so that a comparison can be made for identifying the user(s). The wireless signals can be of various types, including RF signals. In one embodiment, the wireless signals can be transmitted from a device other than the mobile communication device 181. For example, a user of the mobile communication device 181 may purchase a ticket to an amusement park and the ticket may include an RFID transmitter that communicates with an RFID reader to determine a general location of the user within the amusement park. The image recognition, such as facial recognition, can then be applied to an image captured of the general location in order to identify the user, to identify the user's position in the general location, and select the appropriate cameras 191 for capturing images of the user in the amusement park. This process can be repeated as the user travels around the amusement park, where RFID readers positioned at various locations detect general locations of the user. In one embodiment, the use of image recognition to identify the user and the user's position can be used when the location data is no longer available, such as within a building. In one embodiment, the image recognition process described above can be used in combination with location data, such as where a particular location is crowded and close-up pictures are to be captured by selected cameras 191.

The server 130 can also be used to facilitate the gathering of the images, such as providing a platform for exchanging communication including control signals between the mobile communication device 181 and one or more of the cameras 191. In one embodiment, the server 130 can provide a platform for negotiation to obtain select images, such as from a commercial entity that is capturing images of an event occurring in the environment 101 (e.g., images of a baseball game that the users are attending) or from another user that has a more desirable image of the location. The negotiation can be based on a number of factors including financial incentives, agreements to share resources or other images, and so forth.

In one or more embodiments, the server 130 can be used for storing personal content that includes the captured images. The server can also be utilized to provide access to the personal content to a variety of remote devices that can include the mobile communication device 181, as well as other devices. The access to the personal content can be provided to various entities, including the user of the mobile communication device 181, as well as other individuals or entities designated or otherwise authorized by the user.

The network of cameras 191 enables capturing images of portions of the environment 101 at various viewing angles and/or at a selected viewing angle. In one embodiment, parameters associated with the images, such as a desired viewing angle or a desired distance can be designated by the user, including in a user profile or as part of a subscription plan. The designated parameters can be utilized by the server 130 in selecting one or more cameras 191 from the group of cameras making up the camera network in conjunction with the location of the mobile communication device 181 and/or the position of the user associated with the mobile communication device. The particular configuration, location and type of cameras can vary.

In one embodiment, the server 130 can be utilized for adding audio content to the personal content. The audio content can be received in real-time from the mobile communication device 181, such as over a voice communication link with the server 130 or another receiving device, or can otherwise be obtained, such as from a recording made by the mobile communication device 181 which is subsequently provided to the server 130. The audio content enables the user(s) of the mobile communication device 181 to enhance the personal content with additional information related to the location, such as descriptions, opinions, notes and so forth. In one embodiment, the audio content can be originated at the mobile communication device 181 and transmitted to the server 130. In another embodiment, the audio content can be originated at other mobile communication devices and transmitted to the server 130 or to the mobile communication device 181. In one embodiment, the mobile communication device 181 or other mobile communication devices can provide a notice, such as a blinking icon or audio signal, to alert the user(s) that images are being captured by one or more cameras 191. This notice can enable the user(s) to begin generating audio content. In one embodiment, the notice presented at the mobile communication device 181 or other mobile communication devices can provide information indicative of a location of the camera that is actively capturing images.

In one embodiment, the server 130 can perform voice recognition analysis on the audio content to generate user notations. The user notations can be parsed and analyzed to determine a subject matter of the user notations. The analysis can include various techniques and components including conversion to text, use of natural language engines, use of grammatical recognition libraries and/or use of rhetorical recognition libraries. The server 130 can associate the user notations with particular images of the personal content based on the determined subject matter, the location of the mobile communication device 181 and/or time data associated with the captured images. For example, the server 130 can apply image recognition to a first image that depicts the Statue of Liberty and associate an audio notation regarding the origin of the Statue of Liberty with the first image. A second image of the user captured by another camera may depict the dock of Liberty Island without showing the Statue of Liberty and the server 130 can avoid associating the audio notation with the second image. The personal content can include notation information representative of the audio content assigned to the relevant images. The notation information can be in various formats, including the original recorded audio content or a transcription of the audio content. In one embodiment, the audio content can be a continuous note from a user which is parsed and analyzed by the server 130 to determine multiple subject matters that correspond to different images captured as the user travelled to different locations.

In one embodiment, ancillary information can be provided with the personal content based on the determined subject matter of the audio content. For example, audio content that asserts that it is very cold on Liberty Island can be analyzed to obtain ancillary information related to desirable dates to visit Liberty Island. The ancillary information can be presented subject to permission or authorization of a subscriber capturing the images.

In one embodiment, the server 130 can be utilized for filtering portions of the personal content. As an example, parental controls, user preferences, digital rights management and so forth can be utilized in determining whether captured images or portions thereof should be filtered out (e.g., obscured or removed) of the generation of the personal content. For instance, images depicting actions occurring in an audience of an event in the environment 101 that are inappropriate for children can be filtered out of the personal content. The filtering can be based on user preferences, information stored in a user profile, monitored consumption of a user and so forth. The filtering can be based on criteria associated with the user of the mobile communication device 181 and/or can be associated with a viewer that has requested access to the personal content. The filtering can be performed by the server 130 and/or by other devices, utilizing image recognition. In one embodiment, the original images can be retained so that the filtered portions can be viewed.

In one or more embodiments, the server 130 can perform recognition analysis on the personal content to identify marketing material present in the images. The server 130 can alter the images to provide other marketing material. For example, an image may include a billboard with an advertisement for an obsolete model of a product of a commercial entity. The server 130 can recognize the marketing material associated with the obsolete model and adjust the image to depict the current model of the product on the billboard. The marketing material in this example is not intended to be limited to direct advertising and can include the product being present in the image, such as replacing an older version of a product with a newer version of the product.

The adjustment to the image by the server 130 can be based on marketing information provided to the server 130 by the commercial entity. The adjustment to the image can be based on permission or authorization provided by the subscriber that captured the image, such as based on a user profile of the subscriber which authorizes such adjustments. The exemplary embodiments can also include a combination of the server 130 and the media processor 106 or some other device performing the recognition analysis and/or image adjustments. In one embodiment, the adjustment to the image can include adding marketing material to an area of the image that did not previously include marketing material. For instance, the image can be adjusted by adding a bottle of soda of a particular brand on a table in a restaurant where the table previously only depicted dishes. The server 130 can utilize the image recognition for intelligently adding the marketing material, such as recognizing that the image is of a table in a restaurant where there are no beverages being shown and adding the bottle of soda accordingly.

In one embodiment, marketing content to be added to the image or to replace other marketing content already in the image can be selected by the server 130 or another device based on demographic information that is representative of the image and/or based on monitoring of access to the image. For example, server 130 can provide various viewers with access to an image captured by way of the network of cameras 191. Demographic information associated with the viewers can be gathered or otherwise received by the server 130 to determine corresponding marketing content to be depicted in the image. In one embodiment, the determined subject matter of audio content associated with select images can be utilized in selecting marketing content for adjusting the images.

The media processors 106 and mobile communication devices 116 and 181 can be adapted with software functions 164 and 166, respectively, to further utilize the services of the server 130. For example, the media processors 106 can be adapted to execute software functions 164 to access personal content stored in a cloud computing environment coupled with the server 130 and to adjust images based on user preferences, marketing materials and so forth. As another example, the software functions 166 can include transmitting location information that is utilized for selecting the appropriate cameras 191 from the network of cameras, providing wireless signals that are utilized locally to determine a general location of the mobile communication device 181, and/or providing control signals to control one or more of the cameras 191, such as adjusting a viewing angle or adjusting a zooming function of the camera. The control signals can be communicated locally such as from the mobile communication device 181 to a receiver coupled to the camera 191 or can be provided via the server 130, such as the mobile communication device transmitting the communication signals over a network to the server 130 which relays the control signals to the appropriate camera.

In one or more embodiments, other devices can perform one or more of the functions described with respect to the server 130, such as the mobile communication device 181 performing the selection of the cameras 191 based on the location information or the recognition analysis.

Communication system 100 can also employ IP Multimedia Subsystem (IMS) network architecture to facilitate the combined services of circuit-switched and packet-switched systems.

Figure 2:
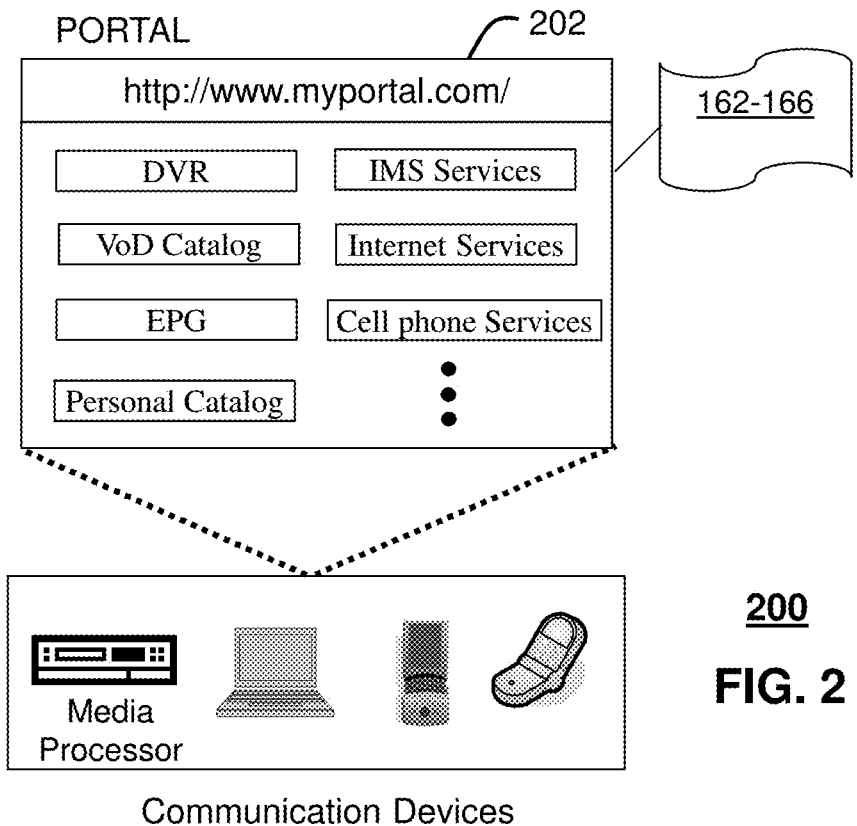
FIG. 2 depicts an illustrative embodiment of a web portal for interacting with the communication system of FIG. 1.

FIG. 2 depicts an illustrative embodiment of a web portal 202 which can be hosted by server applications operating from the computing devices 130 of the communication system 100 illustrated in FIG. 1. The web portal 202 can be used for managing services of communication system 100. A web page of the web portal 202 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIG. 1. The web portal 202 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 202 can also be used for provisioning IMS services described earlier, provisioning Internet services, provisioning cellular phone services, and so on.

It is contemplated by the present disclosure that the web portal 202 can further be utilized to manage and provision software applications 162-166 of the devices of FIG. 1, respectively, as described earlier. In one embodiment, web portal 202 can be utilized for selecting preferences associated with altering captured images, such as obscuring inappropriate content or automatically updating or removing marketing material on objects in the images. Other preferences can also be selected via the web portal 202, such as desired viewing angles for the images, desired viewing distances and so forth. In one embodiment, a first user can obtain images associated with a particular location that were captured by a second user using the network of cameras 191. As an example, the first user may have been unable to capture a desirable image of a location, such as the Statue of Liberty, due to poor weather. The inability to capture the desired image may be detected by the first user at the time of visiting the Statue of Liberty or at a subsequent time upon review of the captured images from the network of cameras 191. A second user may have captured clearer images of the Statue of Liberty on a day when the weather was better. The server 130 can enable the first user to review and obtain the clearer images to be added to the personal content of the first user. In one embodiment, the sharing of the images can be based on an incentive provided to the second user, such as revenue sharing, a discount towards use of the camera network service, an agreement to share certain images of the first user presently or in the future, and so forth.

In one embodiment, the obtained images of the second user can be altered for privacy reasons. For example, individuals appearing in the obtained images (e.g., the second user or the second user's family) may be obscured or removed from the obtained images. As another example, audio content or notes associated with the obtained images of the second user may be removed or otherwise adjusted to disable access to them by the first user when the obtained images are added to the first user's personal content. The alteration of the obtained images can be based on the sharing agreement accepted by the second user.

Figure 3:
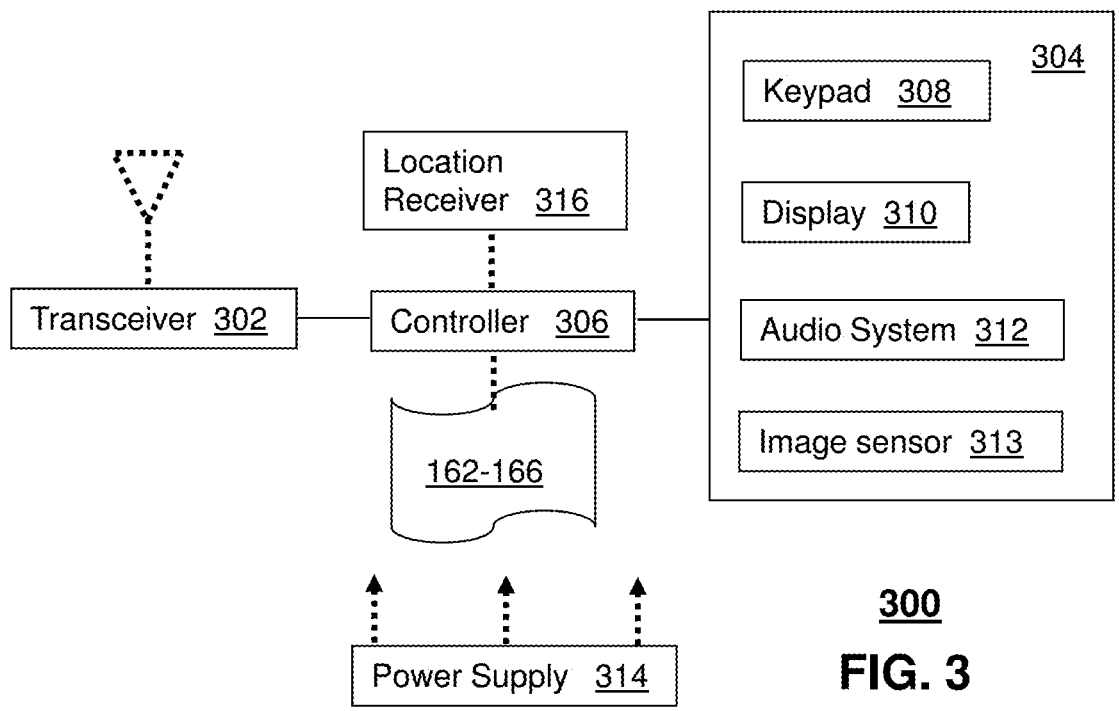
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the devices depicted in FIG. 1. The communication device 300 can comprise one or more of a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), RF communications or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310 with navigation features.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver capable of assisted GPS for identifying a location of the communication device 300 based on signals generated by a constellation of GPS satellites, thereby facilitating common location services such as navigation.

The communication device 300 can use the transceiver 302 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such as Flash, ROM, RAM, SRAM, DRAM or other storage technologies.

The communication device 300 can be adapted to perform the functions of the media processor 106, the media devices 108, or the portable communication devices 116 or 181 of FIG. 1. It will be appreciated that the communication device 300 can also represent other common devices that can operate in communication system 100 of FIG. 1 such as a gaming console and a media player. The communication device 300 can be provisioned with, or otherwise have access, to all or a portion of the software functions 162-166 to enable the communication device 300 to communicate with the server 130 and/or the cameras 191 for capturing images and/or audio content associated with the environment 101, such as when the communication device 300 is present in the environment. In one embodiment, software can be disabled or removed automatically upon expiration of services associated with the cameras 191. For example, a subscriber may obtain a service plan that enables capturing images from cameras 191 over a pre-determined time period. Upon expiration of the time period, the software that enables the capturing of the images, such as location information provided by the communication device 300 to the server 130 for initiating image capture by select cameras 191, can be disabled or automatically removed from a memory of the communication device without user intervention.

Illustrative embodiments of methods that can operate in portions of the communication device of FIG. 3 are described below.

Figure 4:
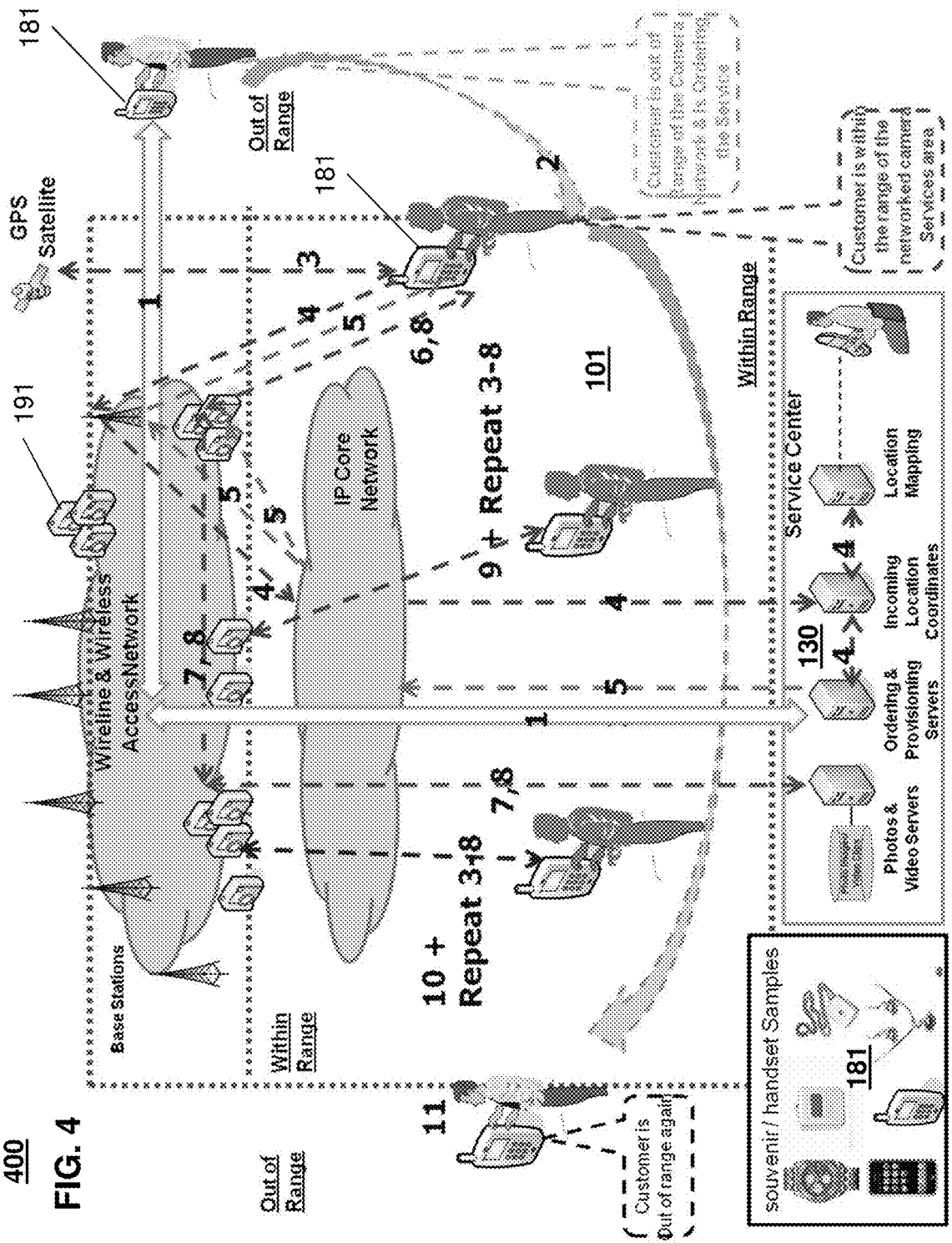
FIG. 4 depicts an illustrative embodiment of a process flow for the system of FIG. 1.

FIG. 4 depicts an illustrative embodiment of a processing flow 400 for generating personal content associated with the environment 101. The processing flow 400 can be utilized with communication system 100 as another representative embodiment of communication system 100. Processing flow 400 can include various components described with respect to system 100, such as server(s) 130, mobile communication device 181, and cameras 191. Processing flow 400 can also include additional components or fewer components than system 100.

At step 1, a user can utilize mobile communication device 181 or another communication device to subscribe to a networked camera service, such as in a historic district of a city. An ordering transaction can be received by server 130 (e.g., ordering and provisioning server) in a service provider's service center. In this example, the user can desire only to capture personal content in the historic district and can subscribe to the corresponding service plan. Other service plans can be made available to the user with various options for images such as images for multiple locations, outdoor images, indoor images, all available camera images, images from cameras within a maximum distance of the user and/or timing of the images (e.g., capturing images before, during or after user is within field of view of the cameras 191).

At step 2, the user is heading to the service area, which in this example is the historic district. At step 3, the GPS or other location functionality of the mobile communication device 181 can enable the user to determine his true location in a map displayed on the device. At step 4, the location data or coordinates are sent from the mobile communication device 181 to the server 130 (e.g., a location coordinates server). The server 130 can perform location mapping service, as well as a service order validation service. At step 5, particular cameras 191 can be identified and selected from a group of available cameras based on a number of factors, including the location data, user preferences, service plan, and so forth. The selected cameras 191 can be activated by the server 130. In one embodiment, a set of qualified cameras 191 from the group of cameras can be identified for a user who can select one or more desired cameras from the qualified cameras. The identification information provided to the user can include a location of the qualified cameras, parameters of the qualified cameras, sample images captured by the qualified cameras, recommendations for selecting the qualified cameras, and/or information as to which qualified cameras were more often utilized by other users.

In one embodiment at step 6, the user can communicate control signals with the selected camera(s) directly or indirectly to set the zooming and angle requirements. In another embodiment, control commands can be provided from the server 130 or another control device. At step 7, captured images, including still images and video content, can be streamed or otherwise provided to the server 130 (e.g., the photo and video server) for storage. In one embodiment, audio notes or a representation of the audio notes received from the mobile communication device 181 or from another communication device can be recorded on the server 130. At step 8, the user can review the personal content on demand. At step 9, the user travels to another region of the historic district. The process flow of steps 3 through 8 can be repeated using a different set of cameras 191 of the camera network. At step 10, the user travels to yet another region of the historic district. The process flow of steps 3 through 8 can be repeated using a different set of cameras 191 of the camera network. At step 11, the user travels outside of the historic district.

After the video or still images are captured, the user can have immediate access to these images. The user can edit, delete and/or expand the personal content with other landmarks or attractions to create an integrated tour video/pictures story. The user can also request the service provider to either stream the personal content or portions thereof to communication devices of other entities or individuals, including friends, relatives, social network members, and/or cloud storage, which can be done in real-time or at a prescheduled time window. The cloud storage provided by the service provider can enable the user to store all personal content in the cloud associated with the user's service account. The service account can be the same account as the user's TV or Internet service account or can be linked to the user's TV or Internet service account. In one embodiment, the services provided via the server 130 and the IP network of cameras 191 can be offered for potential users (e.g., tourists) to preview real-time or batch street scenes. In this example, human images can be altered to maintain privacy.

If real time audio communication is desired, the mobile communication device 181 can be an audio agent. The mobile communication device 181 can enable receiving acknowledgement messages when personal content is successfully delivered to a remote end. In one embodiment, the service can utilize a prepaid business model, such as based on a time period, number of images captured, number of images saved, and so forth. In another embodiment, the user can select a post-paid model, such as if the provider is also the user's local service provider.

In one embodiment, if a souvenir wireless device is purchased and utilized as the mobile communication device 181 then its advanced capability (e.g., location data transmittal and/or audio content recording) can be disabled after the service period has expired. In one embodiment, the souvenir wireless device can be reactivated at a later time for subsequent use of the personal content service.

The personal content service can enable remote control capability. The remote control feature allows a friend or designated person to interact with the cameras 191 to take the best shots remotely, away from the scene. This can be done through Internet, IPTV, handsets or other communication devices. Because the network of cameras 191 may be shared among a number of users, priority commands and other policies can be established to avoid control conflicts.

In one embodiment, the personal content service can be utilized as an extension to home monitoring product offerings. For example, GPS equipped wireless devices that are presently being worn by persons for monitoring can be utilized with the server 130 and the cameras 191 to obtain snapshots of the monitored person.

In one embodiment, the mobile communication device 181 allows a user to select an auto mode or a controlled mode. The auto mode can allow the service providers' network of cameras 191 to capture an agreed upon amount of images to be reviewed and purchased at later time. The controlled mode can allow the mobile communication device 181 to provide "Start", "Pause" and "Stop" commands. In one embodiment utilizing a prepaid business model, a predetermined amount of still images and video content and/or elapsed time can be selected as a contractual agreement between the provider and user. When the predetermined limit is reached, the mobile communication device 181 can be alerted to allow the user to decide if extension of the contract is desired.

In one embodiment, the server 130 can enable the user to review images of the personal content and provide them to nearby print shops. In one embodiment, users can choose to deactivate the image capturing functions at anytime in any location by using the internet (e.g., using the mobile communication device 181) or by calling the provider such as via a toll-free number. The images once captured can be shared or streamed to user selected destinations, such as a facebook page, video sharing capable devices or personal storages.

Figure 5:
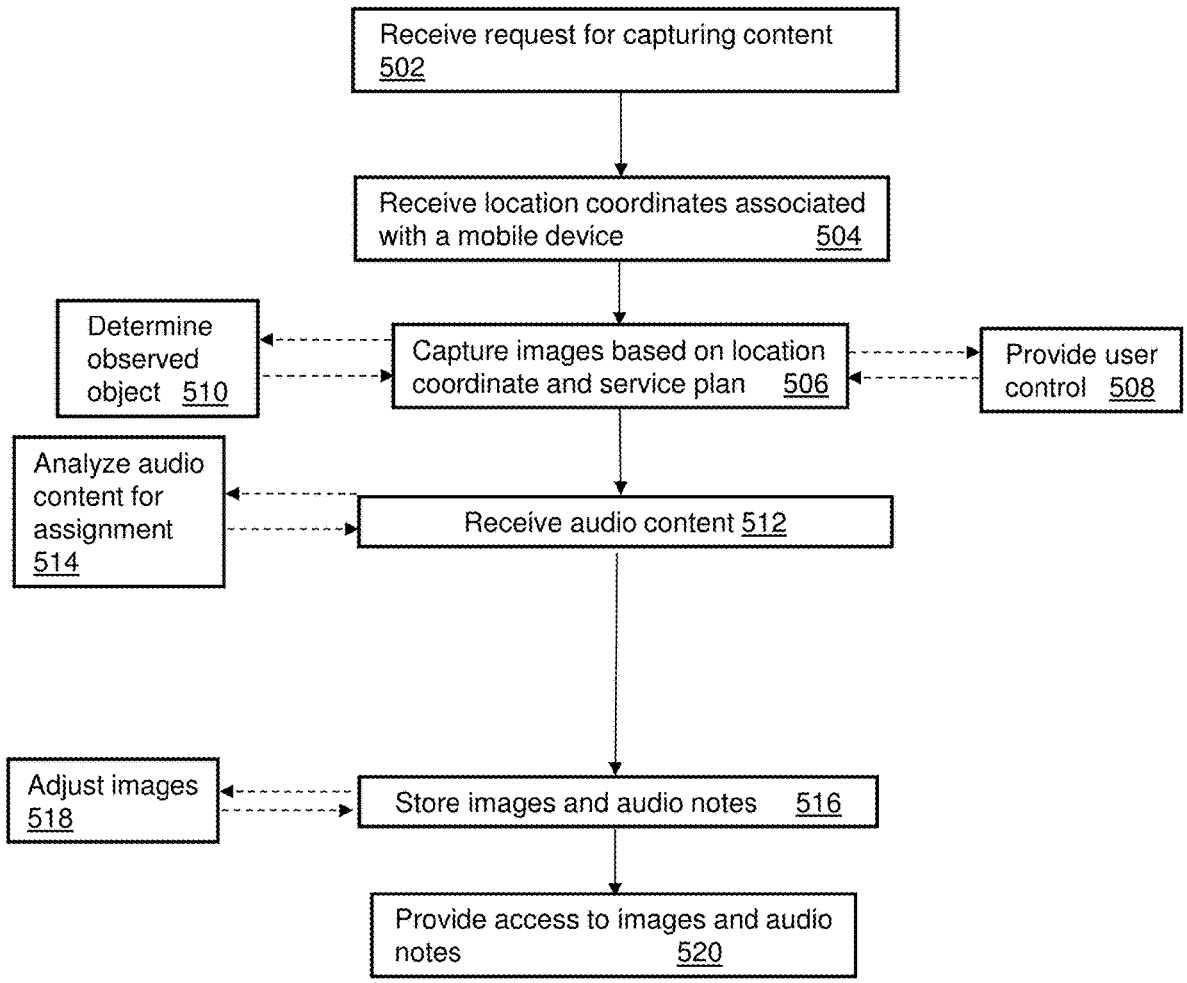
FIG. 5 depicts an illustrative embodiment of a method operating in portions of the system and process flow of FIGS. 1 and 4.

FIG. 5 depicts an illustrative method 500 that operates in portions of the systems, devices and processing flows of FIGS. 1-4. Method 500 can begin at 502 in which a request for capturing images via a network of cameras 191 is received by the server 130. The request can be received via the mobile communication device 181 or from another communication device. At 504, location information or data, such as GPS coordinates, associated with the mobile communication device 181 can be received by the server 130. The location information can be generated by and received from the mobile communication device 181 or can be generated by and received from other devices, including network elements that are, or have been, in communication with the mobile communication device.

At 506, images can be captured by select cameras 191 that are chosen from among the network of available cameras. The selection of the cameras 191 can be based on various criteria, including the location of the user of the mobile communication device 181 (determined via the location information), the user's service plan, user preferences for types of images, and so forth.

In one embodiment at 508, the user of the mobile communication device 181 or another individual associated with the user can be provided with control over one or more of the selected cameras 191. The level of control can vary, and can include viewing angle and zooming functions. In one embodiment, the control signals can be received directly by the camera 191 from the mobile communication device 181.

In one embodiment at 510, one or more cameras 191 can be selected based on an object being observed by the user(s) associated with the communication device 181. For example, an image of the user(s) of the mobile communication device 181 can be captured and image recognition can be applied to determine what object is being observed by the user(s). Determination of a viewing angle of the user(s) (e.g., estimating or determining the direction the eyes or the head of the user(s) are facing) in the image can be utilized in combination with known objects within sight of the location of the user(s). The objects can be known via image recognition applied to the captured image (e.g., a bald eagle sitting on a tree branch in the captured image) and/or known based on provisioned information, such as a list of objects of interest being assigned to various camera locations (e.g., a statue on a cliff that is viewable from the location of the user(s)). Once the object being observed by the user(s) is determined, one or more cameras 191 can be directed (such as by control signals from the server 130) to capture images of the observed object, where the captured images may or may not depict the user(s).

At 512, audio content can be received by the server 130. The audio content can be received from the mobile communication device 181 in real-time (e.g., over a voice communication link) or can be recorded by the mobile communication device and subsequently provided to the server 130. In one embodiment, other communication devices can also provide the audio content to the server 130, such as a friend of the user that is also present at the location with the user that transmits audio content to the server which is assigned to the personal content of the user. In one embodiment, a telephone number, URL or other addressing information can be provided for delivery of the audio content to the server 130 for designation with the personal content of the corresponding user. The server 130 can receive audio content from multiple sources and at various times, including in real-time or subsequent to the capturing of images.

In one embodiment at 514, the audio content can be analyzed for assignment to the corresponding images of the personal content. The audio content can be analyzed utilizing voice recognition to determine a subject matter of the audio content, which can be used, along with timing of the images and image recognition that provides a summary of the scene of the image, to assign the audio content to the corresponding images. At 516, the images and the audio notes (e.g., audio signals or a text transcript) can be stored by the server 130 as personal content of the user.

In one embodiment at 518, the images of the personal content can be adjusted. The adjustment can be based on user preferences, such as obscuring or removing undesired imagery in an image or changing marketing content in the image. Other adjustments are also contemplated, including adjusting a format of the images to facilitate access by other communication devices.

Access to the personal content that includes the images and audio notes can be selectively provided to various communication devices, such as based on an authorization provided by the subscriber of the personal content service. The access can be to all of the personal content or a portion thereof, such as to only limited images or to images without audio content.

Figure 6:
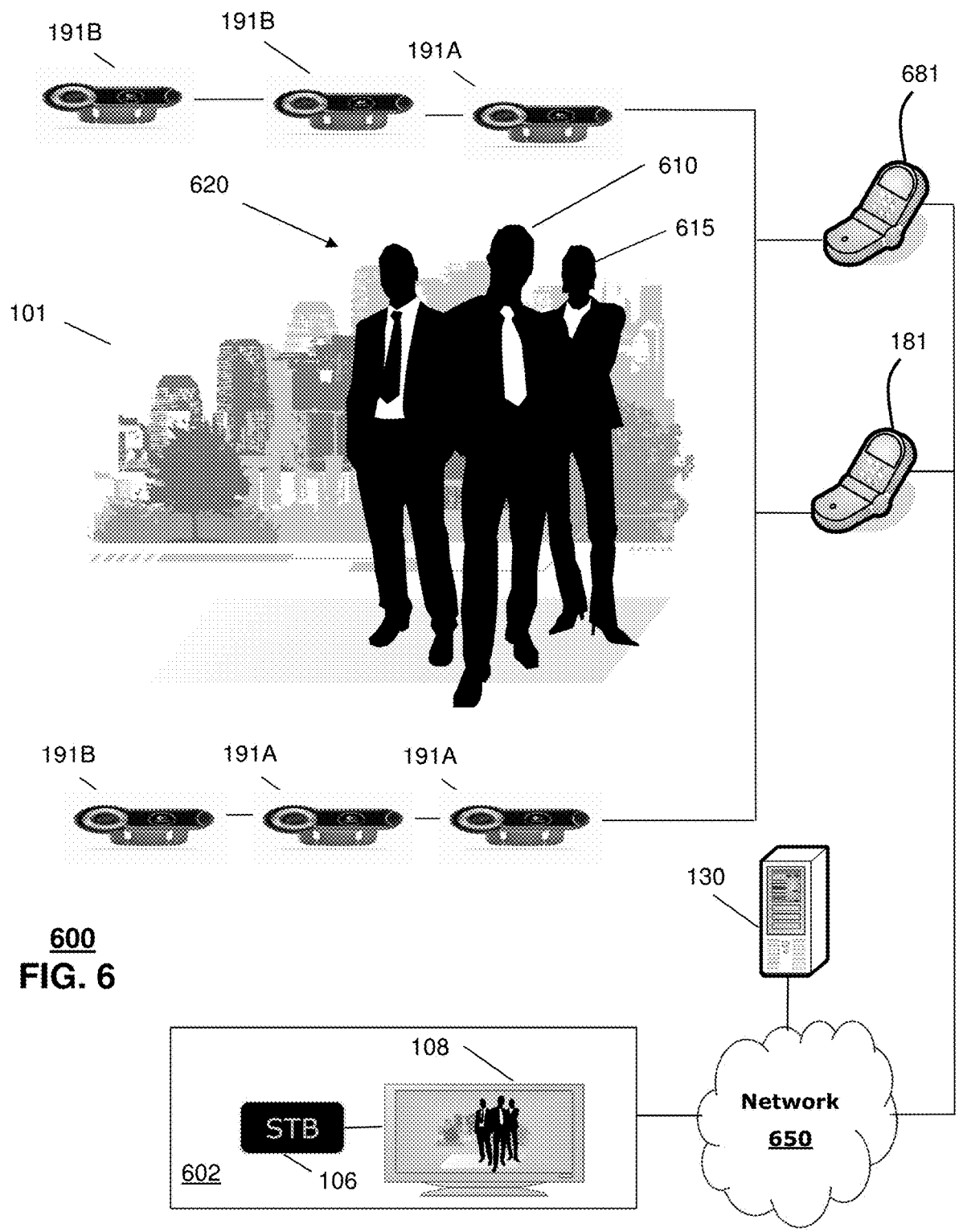
FIGS. 6-7 depict illustrative embodiments of communication systems that provide content.

FIG. 6 depicts an illustrative embodiment of a system 600 for generating personal content associated with the environment 101. System 600 can be overlaid or operably coupled to communication system 100 as another representative embodiment of communication system 100. System 600 can include the server 130 in communication with the media processor 106 (such as a set-top box), the mobile wireless communication devices 181 and 681 (such as mobile phones, smart phones, wireless souvenirs having location transmission capability but without voice communications capability, and so forth) and the cameras 191A and 191B. The mobile communication devices 181 and 681 and the cameras 191A and 191B can be communicatively coupled to the server 130 by way of a network 650 (e.g., a mobility network) coupled to the Internet or other communication means. Personal content including images captured by one or more of cameras 191A and 191B can be accessed via the server 130 and presented at premises 602 using the display device 108.

In this example, the first mobile communication device 181 can be associated with a subscriber 610 of the personal content service plan. A second mobile communication device 681 can be associated with another individual 615 that is travelling with the subscriber 610 and has been associated with the subscriber for the service plan. In one embodiment, the subscriber 610 can identify the individuals (e.g., when ordering the service plan) that make up the subscribers party 629 (in this example there are two other individuals) so that those individuals can be provided with some or all of the services under the service plan. In one embodiment, the subscriber 610 can selectively provide services to the other individuals, which may or may not be the same level of services for each of the individuals. Identifying the other individuals can include providing recognition information for the other individuals to the server 130 and/or providing to the server 130 device information for the communication devices (e.g., device 681) such as identification information to facilitate communication with these devices, format capabilities and so forth.

Location information, wireless signals and/or image recognition (e.g., facial recognition) can be used to determine a position, location or general location associated with the party 620 (e.g., user(s) of the mobile communication device 181) as described previously with respect to system 100, processing flow 400 and method 500. For example, the mobile communication device 181 can transmit GPS data to the server 130 for determining a location of the party 620 or facial recognition can be performed on the individual 615 to determine a position of the party 620.

Based on the determined position or location, the server 130 can select available cameras from the network of cameras to capture images of the party 620. In this example, the server 130 has determined that cameras 191A are available for capturing images while cameras 191B are not available. The availability of the cameras 191A and 191B can be based on a number of factors. For example, one or more of the cameras 191B may have its field of view blocked due to the position of the party 620. In another example, the availability can be based on the cameras 191A being capable of capturing a more desired image than the cameras 191B, such as due to viewing angle, zooming functionality, distance from the party 620, objects in the background of the viewing angle, type of camera, and so forth. In another example, one or more of the cameras 191B may not be selectable according to the subscriber's service plan, such as where one of the cameras 191B is a high resolution camera at a particular location which requires a service upgrade that was not selected by the subscriber when purchasing the service plan. In another example, one or more of the unavailable cameras 191B can be operated by another entity which requires a service upgrade that was not selected by the subscriber when purchasing the service plan. In one embodiment, the availability of the cameras 191A and 191B can be based on current utilization by other subscribers. For example, one of the unavailable cameras 191B may be under the exclusive remote control (e.g., viewing angle and/or zooming function) of another subscriber. In this example, restricting sharing of exclusive cameras can avoid images that include more than one subscriber party.

In one embodiment, the selection of the cameras 191A can be made or otherwise confirmed by the subscriber and/or other members of the party 620. For example, the server 130 can provide a message to the mobile communication device 181 and/or the mobile communication device 681 to identify the cameras which may then be selected for use.

Once selected, cameras 191A can capture images of the party 620 which are provided to the server 130. In one embodiment, one or more of the cameras 191A can be under the control of the party 620 via command signals originated from the mobile communication device 181 and/or the mobile communication device 681. A preview of the images can be provided to the mobile communication device 181 and/or the mobile communication device 681 to facilitate user input, which can include adjusting the viewing angle and adjusting the zooming function of the camera(s) 191A. In one embodiment, the mobile communication device 181 can be controlling a first camera 191A while the mobile communication device 681 can be controlling a second camera 191A. The control signals can be sent via various paths including directly to the camera 191A from both devices 181 and 681, by way of the server 130, and/or by way of the mobile communication device 181 when the signals are originated at the device 681.

In one embodiment, audio content can be originated at either or both of the mobile communication device 181 and the mobile communication device 681. The audio content can be provided to the server 130, such as over a voice communication link, for storage with the personal content that includes the captured images from cameras 191A.

Figure 7:
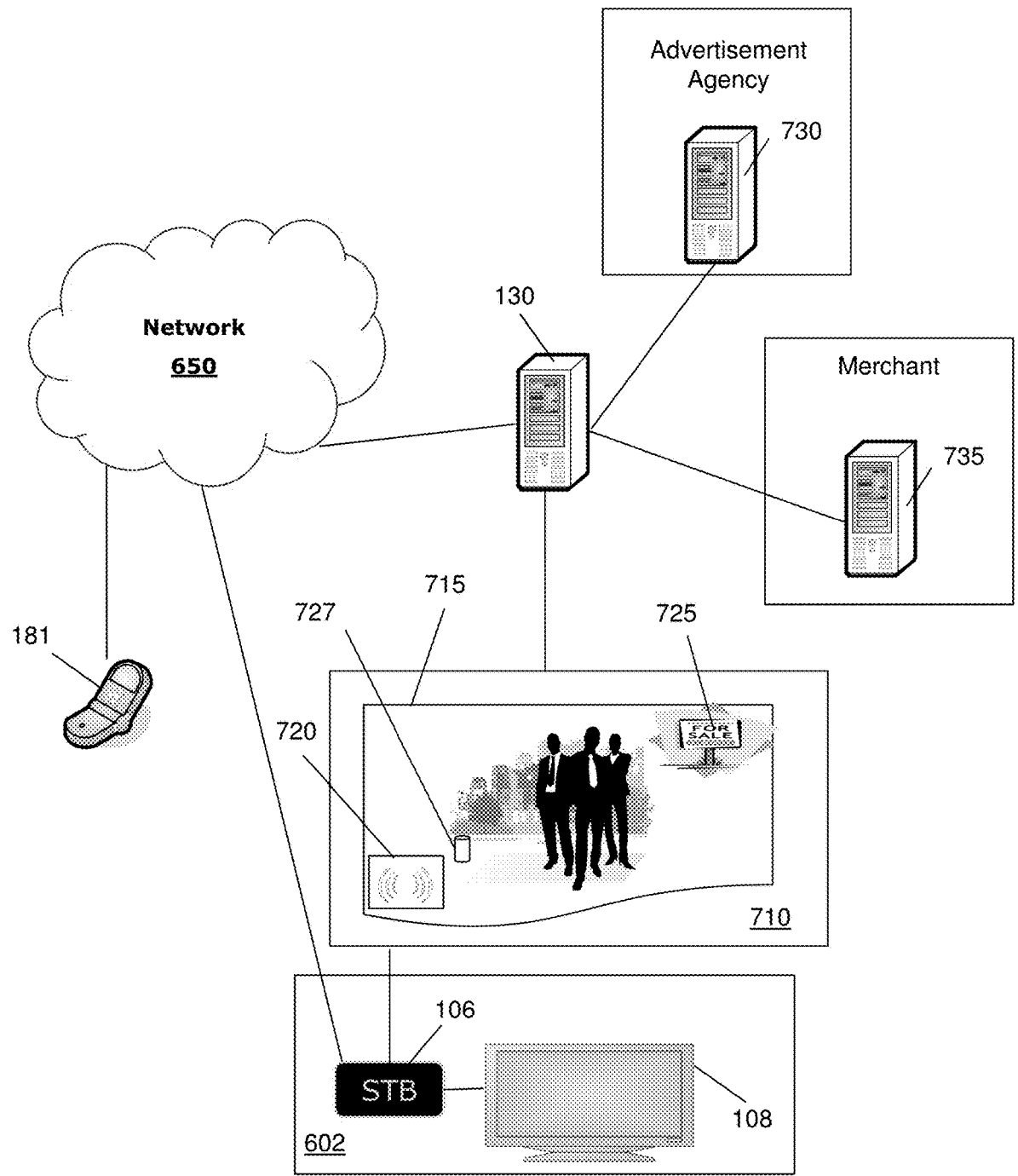

FIG. 7 depicts an illustrative embodiment of a system 700 for managing marketing content that is used with personal content 715 generated by a user. As described elsewhere herein, the personal content 715 can be generated based at least in part on images captured by a network of cameras 191 and a location or position determination of the user(s) associated with the mobile communication device 181. System 700 can be overlaid or operably coupled to communication systems 100 and 500 as another representative embodiment of communication systems 100 and 500. The adjustment of images, monitoring of access and/or other techniques described with respect to system 700 can be performed based on an authorization or permission provided by the subscriber that has generated the personal content 715. The authorization or permission can be limited, such as allowing up-dating of marketing content but denying additions of marketing content. Original images can be maintained so that the subscriber can readily access the image in its captured form.

System 700 can include the server 130 in communication with media device or processor 106 (such as a set-top box at location 602) and mobile wireless communication device 181 (such as mobile phones, smart phones, souvenir location transmitting devices, and so forth), as well as other mobile and/or fixed communication devices (not shown). The mobile communication device 181 and the media processor 106 can be communicatively coupled to the server 130 by way of a network 650 (e.g., a mobility network) coupled to the Internet or other communication means. Personal content 715 can be presented at location 602 using the display device 108. The personal content 715 can be stored at a storage device 710, which can be a remote device (e.g., a database accessible by or integrated with the server 130). In one embodiment, copies of the personal content can be stored locally, such as a memory of STB 106 and/or a DVR coupled with the STB). While the exemplary embodiment illustrates one personal content 715, it should be understood that the exemplary embodiment can include any number of personal content that is associated with or generated by various entities, which may or may not include the user at location 602.

The personal content 715 can include notation information 720 that is representative of audio content provided in conjunction with the capturing of the images. The audio content can be processed as described with respect to the systems, devices, processing flows and method 100-600, including being received from the mobile communication device 181 or another mobile communication device. The notation information 720 can be in various formats including a voice recording, digital recording, and text transcript. In one embodiment, the server 130 can translate the audio content into a different language based on the language spoken by the user at premises 602 that is accessing the personal content. In one embodiment, an indicia or icon can be presented in the image(s) that correspond with the audio content where the indicia is selectable for accessing the audio content.

In one embodiment, server 130 can access personal content 715 to determine targeted marketing content that can be provided with the personal content. The server 130 can utilize a number of different factors to select the marketing content. In one embodiment, access to the personal content 715 by other subscribers or users can be monitored. Information can be derived from the access to facilitate selection of targeted advertisements, such as identification information for the users (e.g., age, gender, occupation, salary, and so forth). The identification information can be determined from sources in combination with the monitoring of the access. For instance, monitoring the user access to the personal content 715 can enable the server 130 to determine the identity of the users. User profiles associated with the users can then be consulted to determine other identification information, such as the examples described above. Sources other than user profiles can also be utilized for gathering identification information, such as subscriber plans of the users.

In one embodiment, the server 130 can determine demographic information for the personal content 715, such as typical characteristics of individuals that would desire to consume the personal content. The determined demographic information and/or identification information determined from the access monitoring can be compared to demographic information for the marketing content in order to select marketing content, such as selecting advertising images and/or audio that appeal to a certain age group or other demographic group.

In one embodiment, server 130 can present offers to advertise to various entities, such as an advertisement agency via server 730 and/or a merchant via server 735. In one embodiment, some or all of the data gathered by the server 130 based on the monitoring of the access and/or the demographic information can be provided to the advertising agency server 730 to select particular marketing content which can then be offered to the merchant via server 735.

An offer, whether made from the server 130 or from another entity, can be based on the demographic information and/or the identification information as described above. In one embodiment, a value can be determined for the advertising and the offer can be based on the value. For instance, personal content of a user that has been accessed by several thousand people may be deemed as a higher value than personal content that has been accessed by less than one hundred people.

Marketing content 725 can be provided for presentation with the personal content 715. The particular type of advertisement content can vary. For instance, the marketing content 725 can be still or moving images that are overlayed on the images of personal content 715, such as in an area so as not to block points of interest in the images (e.g., an upper corner of the images). In one embodiment, the marketing content 725 can be placed in the images of the personal content 715 to simulate the advertisement being present in the environment. For example, image recognition can be applied to the images to detect a billboard that was captured in the images of the personal content 715. The marketing content 725 can be overlayed on the billboard to simulate the advertisement having been on the billboard at the time of capturing the images of the personal content 715. In one embodiment, other structures captured in the images and/or open space captured in the images can be detected and the marketing content 725 can be positioned on the detected structures and/or open space, such as simulating the advertisement being on the side of a brick building and/or simulating an advertisement sign being in a field captured by the images of the personal content 715.

In one embodiment, the marketing content 725 or a portion thereof can be selectable in order to purchase product or service associated with the advertisement. In one embodiment, a selection of the marketing content 725 or a portion thereof can provide a link to a website of a merchant (e.g., being run by the server 735) so that the user who selected the advertisement can purchase product or service associated with the advertisement. The exemplary embodiments can include other configurations and methodologies to enable purchase of product via a selection of the marketing content 725 or a portion thereof, such as providing a link to a third party that manages the purchase process. The exemplary embodiments can also include revenue sharing for the user that generated the personal content 715 and/or the service provider that provided the access to the personal content. For example, sales of products that are associated with a selection of the marketing content 725 and/or access to a website of a merchant via the selection of the advertisement can be used to calculate revenue to be provided to one or both of the user that generated the personal content and the service provider that provided the access to the personal content.

In one embodiment, the marketing content can be an object 727 that was captured in the images of the personal content 715 and is adjusted to be advertisement content. For example, object 727 can be a soda bottle that is detected by the server 130 through use of image recognition. The image and/or text recognition can be used to identify a merchant associated with the particular brand of soda. The personal content 715 can be adjusted so that object 727 can be selectable by a user who accesses the personal content. A selection by the user can enable purchasing of the product (or service depending on the object that is made selectable) and/or reviewing additional information related to the selectable object 727. In one embodiment, a symbol or highlighting of the perimeter of the object 727 can be used to indicate to the user who has accessed the personal content 727 that the object is selectable. In one embodiment, a selection of the object 25 can provide a link to a website of a merchant that sells the product or service (e.g., server 735). The exemplary embodiments can include any number and type of objects being made selectable. In one embodiment, the number and/or types of objects made selectable can be controlled by the user that generated the personal content 715. In one embodiment, the type of objects made selectable can be based on demographic information and/or the identification information gathered from monitoring the access to the personal content 715.

Upon reviewing the aforementioned embodiments, it would be evident to an artisan with ordinary skill in the art that said embodiments can be modified, reduced, or enhanced without departing from the scope and spirit of the claims described below.

One or more of the exemplary embodiments can enable a wireless service provider to interact with other entities, such as cities, parks, landmarks, and so forth to install IP based camera networks. The cameras can have the capability of taking high resolution photos or video clips. The cameras can be configured as standalone devices or in a cluster. Each camera or the cluster of cameras can be networked with wired and/or wireless technologies. For a wireless configuration, each of the cameras can have an M2M chipset to communicate to service center servers and/or to controlling devices.

The wireless service provider can create a new class of trip video/photo service packages. The service package can enable subscribers to use networked cameras to take their trip pictures/video clips, while also allowing the subscriber to designate friends/family members that may direct the photo/video taking processes from a remote location. The service package can also allow subscribed customers around the world to view events they normally could only see on TV News or on the Internet. For example, the subscriber could order from the service-provider-covered domain a set of pictures every evening at a designated time. For privacy purpose, these snapshots can be offered with only limited zooming capability.

The service package can allow a tourist or a group of tourists to buy or lease one or more controlling wireless device in the form of a smart phone or a souvenir such as a pendant, bracelet, watch, and so forth. All controlling devices can be waterproof and can have an option to include earphones with wired and/or wireless (such as Bluetooth) connection capabilities. These devices can include a GPS or other location determination chipset, wireless capability (e.g., 2G, 3G or 4G connectivity), control buttons (e.g., to select one or more of the networked cameras, to zoom the networked cameras, to provide start or stop commands to cameras, and/or to authorize additional charges), and/or an optional screen to preview the image to be captured.

Intelligent software (e.g., located either on the controlling device or remote servers) can provide an attraction recommendation guide and an interactive map guide. The tourists can learn recommended places to capture pictures or video clips. Trip notes can be taken by using the built-in controlling device microphone to generate audio content.

The present disclosure enables advertisement content to be customized for personal content that is captured utilizing a network of cameras. The advertisement content can be utilized in revenue sharing with the user that generates the personal content and/or with the service provider that provides others with access to the personal content. Image recognition can be utilized to convert or otherwise adjust objects that were captured in the personal content into selectable objects that allow for purchase of the object, such as via a link to a website selling the object. Other advertising schemes can also be used, including selectable icons overlayed on the images, banners, audio advertisement and so forth.

Figure 8:
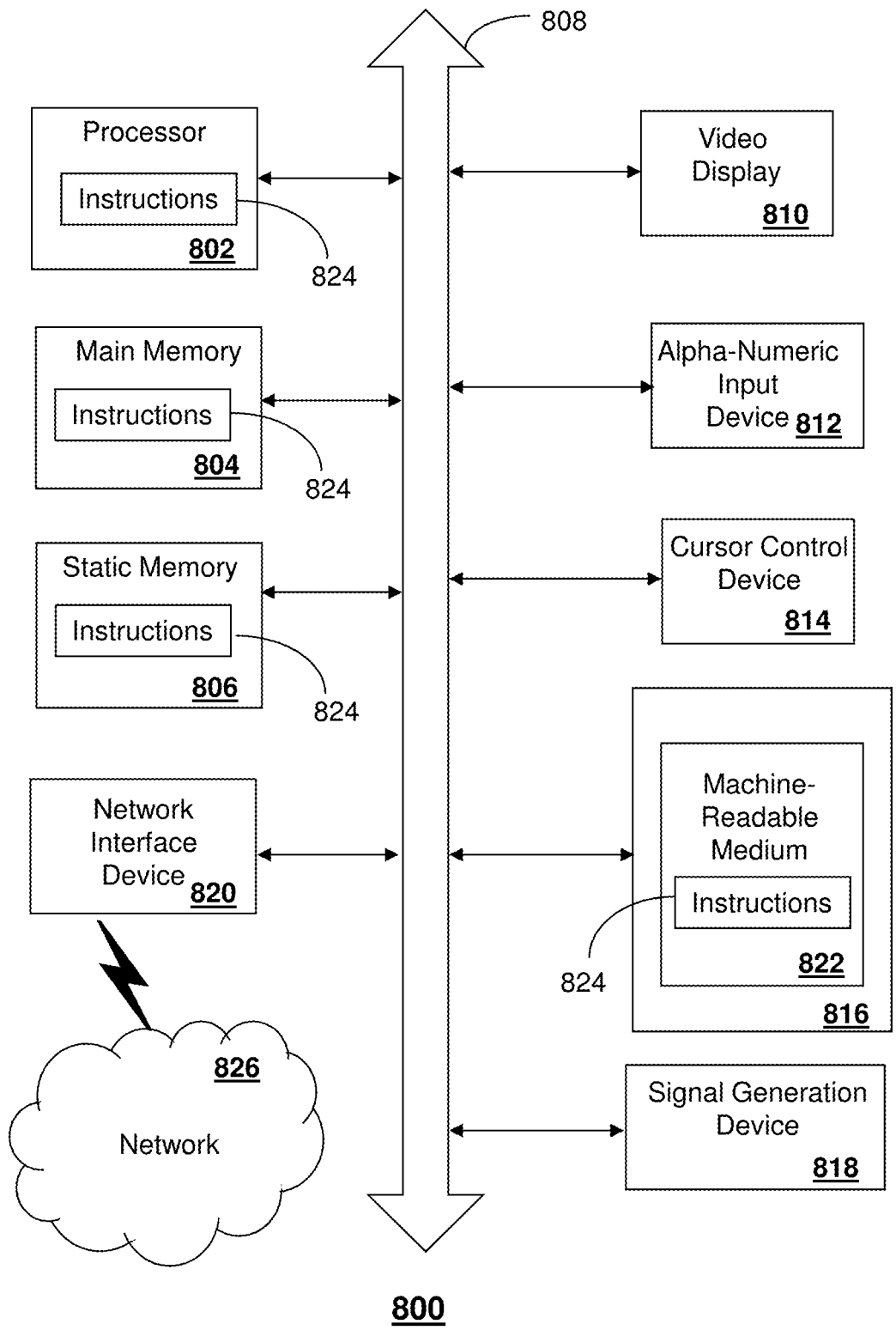
FIG. 8 is a diagrammatic representation of a machine in the form of a computer system within which a set of instructions, when executed, may cause the machine to perform any one or more of the methods discussed herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as a controller circuit and/or memory of the server 130, the media processor 106, the mobile communication devices 181 and 681, the cameras 191 or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, a circuit or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile)

memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
a memory that stores executable instructions; and
a processing system including a processor coupled to the memory, wherein the processing system, responsive to executing the executable instructions, facilitates performance of operations comprising:
receiving location information from a mobile communication device;
determining a location of the mobile communication device based on the location information;
selecting a camera from a group of cameras at the location of the mobile communication device in accordance with a selection of the location by a user of the mobile communication device and in accordance with a user subscription to a networked service to obtain an image of at least a portion of the selected location, wherein the subscription comprises an ordering transaction received by the server;
receiving the image from the camera;
receiving audio content regarding content of the image from the mobile communication device;
analyzing the audio content for assignment to the image;
monitoring access to the image by viewers to collect demographic information, wherein the monitoring access results in collected demographic information of the viewers;
performing image recognition on the image to identify a plurality of product images present in the image;
identifying a first product image from the plurality of product images according to the collected demographic information associated with the viewers, wherein the first product image depicts a product of a commercial entity;
modifying the first product image, based on information provided by the commercial entity, to depict a current model of the product, and by generating a selectable product image comprising an associated website link, wherein the modifying comprises removing an image of an obsolete model of the product and substituting an image of the current model of the product;
transmitting the image to a media device for presentation at the media device;
receiving, from the media device, a selection of the selectable product image from the image being presented at the media device; and
transmitting the associated website link to the media device responsive to receiving the selection.

2. The server of claim 1, wherein the processor comprises a plurality of processors operating in a distributed processing environment and the operations further comprise:
receiving a request from the mobile communication device to share the image with a second mobile communication device; and
streaming the image to the second mobile communication device responsive to the request.

3. The server of claim 1, wherein the location information comprises radio frequency identification signals that are received from a radio frequency transmitter device that is separate from the mobile communication device and that is associated with an identified user of the mobile communication device.

4. The server of claim 1, wherein the operations further comprise providing a platform to facilitate an exchange of communication comprising control signals between the camera and the mobile communication device, wherein the control signals enable control by the mobile communication device over the camera, wherein the control includes a viewing angle or a zoom function.

5. The server of claim 1, wherein the operations further comprise:
generating personal content that includes the audio content, the image, or a combination thereof; and
enabling access to the personal content.

6. The server of claim 5, wherein the audio content is received from a second mobile communication device present at the location with the mobile communication device.

7. The server of claim 1, wherein the operations further comprise:
receiving a second image from a second camera of the group of cameras; and
performing second image recognition on the second image to determine an identified user of the mobile communication device.

8. The server of claim 1, wherein the user of the mobile communication device is different from a subscriber in possession of the mobile communication device, and wherein the operations further comprise enabling the subscriber to access the image.

9. The server of claim 1, wherein the operations further comprise:
obtaining permission from a subscriber associated with the mobile communication device to modify the first product image.

10. The server of claim 9, wherein the obtaining the permission from the subscriber is based on a stored profile associated with the subscriber.

11. The server of claim 1, wherein the operations further comprise:
receiving marketing information from an entity;
obtaining authorization, to alter the image, from a subscriber that is associated with the mobile communication device; and
adjusting the image to add an object that is depicted as being present at the location, wherein the object is generated based on the marketing information, and wherein the object includes marketing content associated with the entity.

12. The server of claim 11, wherein the operations further comprise:
generating personal content that includes the image;
monitoring access to the personal content;
determining demographic information representative of the personal content; and
selecting the marketing content based on the access to the personal content that is monitored and the demographic information.

13. The server of claim 12,
wherein the personal content includes the audio content, and wherein the selecting of the marketing content is based in part on a subject matter of the audio content determined from voice recognition analysis.

14. The server of claim 1, wherein the operations further comprise:
generating personal content that includes the image, wherein the personal content is associated with a first subscriber of the mobile communication device;
providing an offer to share a portion of the personal content with a second subscriber in exchange for an incentive for the first subscriber;
receiving an acceptance of the offer; and
enabling the second subscriber to gain access to the portion of the personal content responsive to the acceptance.

15. The server of claim 1, wherein the server is operated by a service provider, wherein the camera is operated by a second entity different from the service provider, and wherein the image is received from the camera in exchange for an incentive provided to the second entity.

16. A mobile communication device comprising:
a processing system including a processor; and
a memory that stores executable instructions that, when executed by the processing system, facilitate performance of operations comprising:
transmitting location information to a server device, wherein a camera of a group of cameras at a location is selected by the server device for capturing an image of a portion of the location, wherein the camera is selected in accordance with a selection of the location by a user of mobile communication device and in accordance with a user subscription to a networked service, wherein the subscription comprises an ordering transaction received by the server device;
transmitting audio content regarding content of the image to the server device, wherein the server device analyzes the audio content for assignment to the image;
accessing the image, wherein the accessing of the image by a viewer associated with the mobile communication device is monitored by the server device to gather demographic information of the viewer, resulting in gathered demographic information, wherein a plurality of product images is recognized by the server device, wherein a first product image is selected from the plurality of product images according to the gathered demographic information, wherein the first product image depicts a product of a commercial entity, and wherein the first product image is modified by the server device, based on information provided to the server device by the commercial entity, to remove an image of an obsolete model of the product and substitute an image of a current model of the product, and by generating a selectable product image comprising an associated website link in the image for presentation at a media device; and
transmitting a request to the server device to share the image with a second mobile communication device, wherein the server device streams the image to the second mobile communication device responsive to the request.

17. The mobile communication device of claim 16, wherein the processor comprises a plurality of processors operating in a distributed processing environment, and wherein the media device receives a selection of the selectable product image in the image that is presented at the media device, and wherein the server device transmits a website link to the media device responsive to the selection of the selectable product image.

18. A method, comprising:
selecting, by a processing system comprising a processor, a camera from a group of cameras at a location of a mobile communication device in accordance with a selection of the location by a user of the mobile communication device and in accordance with a user subscription to a networked service to obtain an image of at least a portion of the selected location, wherein the subscription comprises an ordering transaction received by the processing system;
receiving, by the processing system, the image from the camera;
receiving, by the processing system, audio content regarding content of the image from the mobile communication device;

analyzing, by the processing system, the audio content for assignment to the image;

monitoring, by the processing system, access to the image by viewers to gather demographic information of the viewers that results in gathered demographic information;

performing, by the processing system, image recognition on the image to identify a plurality of product images present in the image;

identifying, by the processing system, a first product image from the plurality of product images according to the gathered demographic information of the viewers, wherein the first product image depicts a product of a commercial entity;

modifying, by the processing system based on information provided by the commercial entity, the first product image to depict a current model of the product and by generating a selectable product image comprising a website link, wherein the modifying comprises removing an image of an obsolete model of the product and substituting an image of the current model of the product;

transmitting, by the processing system, the image to a media device for presentation at the media device;

receiving, by the processing system, a selection from the media device of the selectable product image from the image being presented at the media device; and transmitting, by the processing system, the website link to the media device responsive to receiving the selection.

19. The method of claim 18, further comprising:

generating, by the processing system, personal content that includes the audio content, the image, or a combination thereof; and enabling, by the processing system, access to the personal content.

20. The server of claim 1, wherein the modifying is based on authorization provided in accordance with the user subscription.

* * * * *